United States Patent
Burton et al.

(10) Patent No.: US 7,943,807 B2
(45) Date of Patent: May 17, 2011

(54) CONTROLLING BRANCH LEVEL AND VISCOSITY OF POLYALPHAOLEFINS WITH PROPENE ADDITION

(75) Inventors: Willie Charles Burton, Zachary, LA (US); E. Brian Fox, Monroe, CT (US)

(73) Assignee: Chemtura Corporation, Middlebury, CT (US)

( * ) Notice: Subject to any disclaimer, the term of this patent is extended or adjusted under 35 U.S.C. 154(b) by 376 days.

(21) Appl. No.: 12/026,981

(22) Filed: Feb. 6, 2008

(65) Prior Publication Data

US 2009/0198089 A1   Aug. 6, 2009

(51) Int. Cl.
C07C 9/22 (2006.01)
C07C 2/30 (2006.01)
C07C 2/34 (2006.01)
C08F 4/6592 (2006.01)
C08F 210/06 (2006.01)
C08F 210/14 (2006.01)

(52) U.S. Cl. .......... 585/18; 585/511; 585/512; 585/520; 526/165; 526/348.3; 526/943

(58) Field of Classification Search .................... 585/12, 585/18, 502, 510, 511, 512, 520; 526/160, 526/165, 348.3, 943
See application file for complete search history.

(56) References Cited

U.S. PATENT DOCUMENTS

| 4,827,064 A | 5/1989 | Wu |
| 5,105,051 A | 4/1992 | Pelrine et al. |
| 5,177,276 A | 1/1993 | Beach |
| 5,315,053 A | 5/1994 | Beach |
| 5,324,800 A | 6/1994 | Welborn |
| 5,420,372 A | 5/1995 | Beach |
| 6,548,724 B2 | 4/2003 | Bagheri |
| 6,706,828 B2 | 3/2004 | DiMaio |
| 6,713,582 B2 | 3/2004 | DiMaio |
| 6,858,767 B1 | 2/2005 | DiMaio |
| 7,037,974 B2 * | 5/2006 | DiMaio et al. ................. 524/579 |
| 7,129,197 B2 * | 10/2006 | Song et al. .................... 508/591 |
| 7,129,306 B2 | 10/2006 | DiMaio |
| 7,795,194 B2 * | 9/2010 | Iimura et al. .................. 508/591 |
| 2003/0055184 A1 * | 3/2003 | Song et al. .................... 526/160 |
| 2003/0149203 A1 * | 8/2003 | DiMaio et al. ................. 526/160 |
| 2003/0232937 A1 | 12/2003 | DiMaio |
| 2008/0171651 A1 * | 7/2008 | Tohi et al. ..................... 502/117 |

FOREIGN PATENT DOCUMENTS

| EP | 0422019 | 12/1993 |
| WO | WO 02/14384 A2 | 2/2002 |
| WO | WO 2008/010865 A2 | 1/2008 |

* cited by examiner

Primary Examiner — Caixia Lu
(74) Attorney, Agent, or Firm — Joseph Suhadolnik

(57) ABSTRACT

The invention relates to a polyalphaolefin formed from a decene and propene and having a branch level greater than 19% and to a process for forming such polyalphaolefins. The invention also relates to a process for forming a polyalphaolefin from at least two monomers, the two monomers comprising a decene and propene, the process comprising the steps of, inter alia, providing a correlation between the total amount of propene used to form the polyalphaolefin and at least one of branch level or viscosity of the polyalphaolefin to make polyalphaolefins comprising decene and propene with predictable branch levels and viscosities.

13 Claims, No Drawings

CONTROLLING BRANCH LEVEL AND VISCOSITY OF POLYALPHAOLEFINS WITH PROPENE ADDITION

BACKGROUND OF THE INVENTION

1. Field of the Invention

This invention relates to polyalphaolefins. Specifically, the invention relates to controlling the branch level and viscosity of polyalphaolefins.

2. Discussion of the Background Information

Catalytic oligomerization of olefins is a known technique for manufacturing hydrocarbon basestocks useful as lubricants. Efforts to improve upon the performance of natural mineral oil based lubricants by the synthesis of oligomeric hydrocarbon fluids have been the subject of important research and development in the petroleum industry for several decades, leading to recent commercial production of a number of superior polyalphaolefin synthetic lubricants (hereinafter referred to as "PAO"). These materials are primarily based on the oligomerization of alphaolefins such as $C_6$-$C_{12}$ olefins. Industrial research effort on synthetic lubricants has generally focused on fluids exhibiting useful viscosities over a wide range of temperatures, i.e., improved viscosity index (VI), while also showing lubricity, thermal and oxidative stability and pour point equal to or better than mineral oil. These newer synthetic lubricants provide lower friction and hence increase mechanical efficiency across the full spectrum of mechanical loads and do so over a wider range of operating conditions than mineral oil lubricants.

Well known structural and physical property relationships for high polymers have pointed the way to alphaolefins as a fruitful field of investigation for the synthesis of oligomers with the structure believed to be necessary to confer improved lubricant properties thereon. Due largely to studies on the polymerization of propene and vinyl monomers, the mechanism of the polymerization of alphaolefins and the effect of that mechanism on polymer structure is reasonably well understood, providing a strong resource for targeting on potentially useful oligomerization methods and oligomer structures. Building on that resource, oligomers of alphaolefins from 6 to 12 carbon atoms have been prepared with commercially useful synthetic lubricants from, e.g., 1-decene oligomerization, yielding a distinctly superior lubricant product via either cationic or Ziegler catalyzed polymerization.

A significant problem in the manufacture of synthetic lubricants is the production of lubricants in a preferred high kinematic viscosity range with good low temperature viscosity characteristics, in good yield, and without excessive catalyst residue. Methods to control the viscosity index are sought after in the art to overcome the problems in the manufacture of, particularly, lower viscosity lubricants.

SUMMARY OF THE INVENTION

It has been surprisingly found that an efficient way to prepare lubricants with good low temperature properties is by forming PAOs comprising 1-decene and propene units. Such co-polymers have high VIs, a variable branch level of greater than 19%, enhanced thickening efficiency and good low temperature properties.

In a first embodiment, the invention is to a polyalphaolefin formed from a decene and propene and having a branch level greater than 19%, e.g., greater than 20%, greater than 21% or greater than 22%. The decene preferably comprises 1-decene.

In some preferred embodiments, the polyalphaolefin has a kinematic viscosity of between 20 and 1000 cSt at 100° C. and a Brookfield viscosity at −40° C. when formulated in a SAE 90 blend of less than 60,000 cPs, e.g., less than 45,000 cPs, or less than 25,000 cPs. The polyalphaolefin optionally has a pour point that is less than −15° C., e.g., less than −30° C. or less than −45° C.

In another embodiment, the invention is to a process for forming a polyalphaolefin, the process comprising the step of polymerizing at least two monomers in a reaction mixture to form the polyalphaolefin, the two monomers comprising a decene and propene, wherein the polyalphaolefin has a branch level greater than 19%, e.g., greater than 20%, greater than 21% or greater than 22%. The decene preferably is 1-decene.

The polymerizing optionally occurs in the presence of a metallocene catalyst, for example, a catalyst having the formula $Ph_2C(Cp-9-Flu)ZrCl_2$ (diphenylmethylene (cyclopentadienyl-9-fluorenyl)zirconium dichloride). The polymerizing optionally occurs with a catalyst system comprising a metallocene catalyst and an aluminoxane co-catalyst. The aluminoxane co-catalyst optionally is an alkylaluminoxane. In a preferred embodiment, the aluminoxane co-catalyst is methylaluminoxane. Optionally, the catalyst system further comprises a borate.

The reaction mixture optionally comprises the decene in an amount greater than 75 weight percent, e.g., greater than 80 weight percent, greater than 85 weight percent, greater than 90 weight percent or greater than 95 weight percent. The reaction mixture optionally comprises the propene in an amount from about 1 weight percent to about 25 weight percent, e.g., from about 10 wt % to about 20 wt % propene, from about 5 wt % to about 15 wt %, or from about 1 wt % to about 10 wt % propene.

In another embodiment, the invention is to a process for forming a polyalphaolefin from at least two monomers, the two monomers comprising a decene and propene, the process comprising the steps of: (a) providing a correlation between the total amount of propene used to form the polyalphaolefin and at least one of branch level or viscosity of the polyalphaolefin; (b) determining a target total propene amount used to form the polyalphaolefin based on the correlation and a desired branch level; (c) forming a reaction mixture comprising the at least two monomers, the reaction mixture comprising the propene in the target propene amount; and (d) polymerizing the at least two monomers in the reaction mixture to form the polyalphaolefin. The polyalphaolefin formed by the process preferably has a branch level greater than 19%, e.g., greater than 20%, greater than 21% or greater than 22%.

DETAILED DESCRIPTION OF THE INVENTION

In one aspect, the invention relates to a polyalphaolefin formed from a decene and propene and having a branch level of greater than 19%. In another aspect, the invention relates to a process for forming a polyalphaolefin, the process comprising the step of polymerizing at least two monomers in a reaction mixture to form the polyalphaolefin, the two monomers comprising a decene and propene, wherein the polyalphaolefin has a branch level of greater than 19%. In some embodiments, for example, the branch level is greater than 20%, greater than 21%, or greater than 22%.

It has been surprisingly found that polyalphaolefins formed from a decene and propene having a branch level of greater than 19%, have enhanced thickening efficiency (lower treat rates), good low temperature properties (e.g., Brookfield viscosity) and can be used as viscosity modifiers. It has also been found that the kinematic viscosity of polyalphaolefins formed from a decene and propene having a branch level of greater than 19% can be controlled by adjusting the propene content in the copolymer. While not being bound by any particular theory, it is believed that the propene content of such polyalphaolefins controls the "branch level" of the polyalphaolefin. The branch level, in turn, impacts such enhanced thickening efficiency (lower treat rates) and low temperature properties of the polyalphaolefin such as Brookfield viscosity. As used herein, the term "branch level" means the methyl content (% —$CH_3$) of the polyalphaolefin as determined by spectroscopic methods (e.g., infrared spectroscopic methods). In one aspect, therefore, the invention is directed to a process for forming a polyalphaolefin that takes advantage of the correlation between the amount of propene used to form the polyalphaolefin and at least one of the branch level or the viscosity of the polyalphaolefin produced. Thus, in one aspect, the invention relates to a process for forming a polyalphaolefin from at least two monomers, the two monomers comprising a decene and propene, the process comprising the steps of:

(a) providing a correlation between the total amount of propene used to form the polyalphaolefin and at least one of branch level or viscosity of the polyalphaolefin;

(b) determining a target total propene amount used to form the polyalphaolefin based on the correlation and a desired branch level;

(c) forming a reaction mixture comprising the at least two monomers, the reaction mixture comprising the propene in the target propene amount; and (d) polymerizing the at least two monomers in the reaction mixture to form the polyalphaolefin. As used herein, the term "total amount of propene used" refers to the total amount, in grams, of propene introduced into the reaction.

The branching level of the PAOs of the preferred embodiments of the present invention is primarily controlled by controlling the amount of propene fed into the reactor. The percent —$CH_3$ in the total polymer increases with increasing propene, thereby raising the branch level of the resulting PAO. In a preferred embodiment, the PAOs produced by the processes of the present invention comprise from about 75 wt % to about 99 wt % 1-decene, e.g., from about 80 wt % to about 90 wt % 1-decene, from about 85 wt % to about 95 wt % 1-decene, or from about 90 wt % to about 99 wt % 1-decene; and from about 1 wt % to about 25 wt % propene, e.g., from about 10 wt % to about 20 wt % propene, from about 5 wt % to about 15 wt %, or from about 1 wt % to about 10 wt % propene.

In a preferred embodiment, the PAO has a branch level of greater than 19%, e.g., greater than 20%, greater than 21% and greater than 22%. A level of greater than 19% is attained when propene is added to the reactor at a rate equivalent to from about 2 to about 10 weight percent of the total decene added to the reactor. PAOs with branch levels of greater than 19% have a kinematic viscosity less than 1000 cSt, e.g., less than 750 cSt, less than 500 cSt, or less than 250 cSt at 100° C. using ASTM D-445. In terms of ranges, the kinematic viscosity optionally ranges from 10 to 400 cSt, e.g., from 20 to 100 cSt at 100° C. Such an advantageous property can be exploited in a variety of products such as, for example, products which require a viscous oil or an inert material with fluid properties. Such products include dispersants, heat transfer fluids, cosmetics or other such consumer products, and the like. The polyalphaolefins having a branch level of greater than 19% of the present invention are particularly useful as viscosity modifiers for lubricating oils wherein the PAO is employed in a viscosity-modifying amount. Concentrations of from about 1 to about 99 weight percent based on the total weight of the lubricating oil composition can be used. Preferably, the concentration is from about 5 to about 85 weight percent.

As indicated above, the polyalphaolefin also preferably exhibits good low temperature properties, which may be reflected by pour point or Brookfield viscosity. In some non-limiting exemplary embodiments, the polyalphaolefin has a Brookfield viscosity at −40° C. when formulated in a SAE 90 blend of less than 60,000 cPs, e.g., less than 45,000 cPs, or less than 25,000 cPs. In terms of ranges, the Brookfield viscosity optionally ranges from 5,000 to 45,000 cPs, e.g., from 10,000 to 30,000 cPs, from 15,000 to 25,000 cPs, or about 20,000 cPs. The polyalphaolefin optionally has a pour point of less than −15° C., e.g., less than −30° C. or less than −45° C.

As discussed above, in a preferred embodiment, a polyalphaolefin is formed from the copolymerization of a decene and propene. The liquid polyalphaolefin copolymers of the present invention containing decene and propene monomers optionally are substantially amorphous, i.e., wherein a crystalline phase is substantially absent from the resulting polyolefin as defined by an exothermic peak observation in a differential scanning calorimetry (DSC) experiment. In addition to being substantially amorphous, the liquid polyalphaolefin copolymers of the present invention optionally possess a unique combination of low weight average molecular weight ($M_w$) (e.g., from about 1000 to about 30000, from about 5000 to about 20000 or from about 7000 to about 15000 g/mol), a low number average molecular weight ($M_n$) (e.g., from about 750 to about 15000, from about 1500 to about 10000, or from about 3000 to about 8000 g/mol), low polydispersity index ($M_w/M_n$) (e.g. from about 1.4 to about 3.0, from about 1.4 to about 2.7, from about 1.7 to about 2.5 or from about 1.9 to about 2.3), low iodine number, and controllable kinematic viscosity.

In some embodiments, the PAOs of the present invention are substantially saturated, i.e., they possess a low iodine number. The PAOs of the preferred embodiments of the present invention can be obtained by polymerizing decene, in the presence of propene and a catalyst composition formed by activating a metallocene procatalyst with a suitable cocatalyst. In an optional embodiment, the polymerization is carried out in the presence of hydrogen gas. In a preferred embodiment, the decene is 1-decene.

Although the preferred embodiments of the present invention involve the formation of a PAO from a decene and propene, other alpha-olefin monomers can be used in place of decene. Exemplary alpha-olefins include olefins containing from 3 to 20 carbon atoms, and preferably from about 6 to about 12 carbon atoms. Suitable alpha-olefins include, for example, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and the like and vinyl aromatic monomers such as styrene, α-methyl styrene and the like.

The catalyst composition used to produce the PAOs of the present invention is formed by activating a metallocene procatalyst with a suitable co-catalyst. The metallocene procatalyst is preferably one or a mixture of metallocene compounds of the formula (I):

$$(Cp^1R^1{}_m)R^3(Cp^2R^2{}_p)MX_q \qquad (I)$$

wherein $Cp^1$ of ligand $(Cp^1R^1{}_m)$ and $Cp^2$ of ligand $(Cp^2R^2{}_p)$ are the same or different cyclopendadienyl rings; $R^1$ and $R^2$ each is, independently, a hydrocarbyl, halocarbyl, heterocarbyl, hydrocarbyl-substituted organometalloid or halocarbyl-substituted organometalloid group containing up to 20 carbon atoms; m is an integer from 0 to 5; p is an integer from 0 to 5; two $R^1$ and/or $R^2$ substituents on adjacent carbon atoms of the cyclopentadienyl ring associated therewith can be joined together to form a ring fused to the cyclopentadienyl ring, the fused ring containing from 4 to 20 carbon atoms; $R^3$ is a bridging group bridging $Cp^1$ and $Cp^2$; M is a transition metal having a valence of from 3 to 6; each X is a non-cyclopentadienyl ligand and is, independently, halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2. Methods for preparing these and other useful metallocene procatalysts are known in the art. The catalyst composition for use herein is preferably formed by activating a metallocene procatalyst with a suitable catalyst. The terms "metallocene" and "metallocene procatalyst" as used herein shall be understood to refer to compounds possessing a transition metal M, at least one non-cyclopentadienyl-derived ligand X and zero or one heteroatom-containing ligand Y, the ligand being coordinated to M and corresponding in number to the valence thereof. Such compounds, cocatalysts useful for their activation to provide metallocene catalysts that may be employed for the polymerization of olefins to provide polyolefin homopolymers and copolymers, and/or polymerization processes employing one or more of the metallocene catalysts are described in, among others, U.S. Pat. Nos. 4,752,597; 4,892,851; 4,931,417; 4,931,517; 4,933,403; 5,001,205; 5,017,714; 5,026,798; 5,034,549; 5,036,034; 5,055,438; 5,064,802; 5,086,134; 5,087,677; 5,126,301; 5,126,303; 5,132,262; 5,132,380; 5,132,381; 5,145,819; 5,153,157; 5,155,080; 5,225,501; 5,227,478; 5,241,025; 5,243,002; 5,278,119; 5,278,265; 5,281,679; 5,296,434; 5,304,614; 5,308,817; 5,324,800; 5,328,969; 5,329,031; 5,330,948; 5,331,057; 5,349,032; 5,372,980; 5,374,753; 5,385,877; 5,391,629; 5,391,789; 5,399,636; 5,401,817; 5,406,013; 5,416,177; 5,416,178; 5,416,228; 5,427,991; 5,439,994; 5,441,920; 5,442,020; 5,449,651; 5,453,410; 5,455,365; 5,455,366; 5,459,117; 5,466,649; 5,470,811; 5,470,927; 5,477,895; 5,491,205; and, 5,491,207, the contents of which are incorporated by reference herein.

When employing the foregoing metallocene procatalyst and the cocatalyst is entirely an aluminoxane, ligand $(Cp^1R^1_m)$ is preferably different from ligand $(Cp^2R^2_p)$, and bridging group $R^3$ preferably contains at least two bulky groups. Of these bridged metallocenes, it is preferred that a bridging group $R^3$ possess the structure:

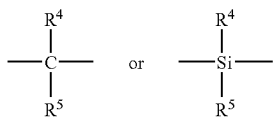

wherein in which bulky groups $R^4$ and $R^5$ each, independently, is, or contains, a cyclohydrocarbyl group containing up to 20 and preferably from 6 to 12 carbon atoms and from 0 to 3 heteroatoms such as oxygen, sulfur, tertiary nitrogen, boron or phosphorus and, in particular, is a cycloalkyl, heterocycloalkyl, cycloalkenyl, heterocycloalkenyl, aryl, heteroaryl, alkaryl, alkylheteroaryl, aralkyl, heteroarallyl, and the like. M in the compound of formula (I) is titanium, zirconium or hafnium, q is 2 and each X is halogen.

Of this preferred group of bridged metallocenes, those in which ligand $(Cp^1R_m^1)$ is substituted or unsubstituted cyclopentadienyl, ligand $(Cp^2R_p^2)$ is indenyl or fluorenyl, M is zirconium, $R^4$ and $R^5$ each is substituted or unsubstituted phenyl and each X ligand is chlorine are particularly preferred.

Exemplary bridged metallocenes of the formula (I) that can be used in the polymerization process of the embodiments of the present invention include, without limitation: diphenylmethylene(indenyl)(fluorenyl)zirconium dichloride, diphenylmethylene(cyclopentadienyl)(4,5,6,7-tetrahydro-indenyl) zirconium dichloride, diphenylmethylene(cyclopentadienyl) (2-methylindenyl)zirconium dichloride, diphenylmethylene (2,4-dimethylcyclo-pentadienyl)(3',5'dimethylcyclopentadienyl)zirconium dichloride, diphenylmethylene(2-methyl-4-tert-butylcyclo-pentadienyl)(3'-tert-butyl-5-methylcyclopentadienyl)zirconium dichloride, dixylylmethylene (2,3,5-trimethylcyclopentadienyl)(2',4,5'-trimethylcyclopentadienyl)zirconium dichloride, dixylylmethylene(2,4-dimethylcyclopentadienyl)(3',5'-dimethylcyclopentadienyl)zirconium dichloride, dixylylmethylene(2-methyl-4-tert-butylcyclopentadienyl)(3'-tert-butyl-5-methylcyclopentadienyl)zirconium dichloride, dixylylmethylene(cyclopentadienyl)(fluorenyl)zirconium dichloride, di-o-tolylmethylene(cyclopentadienyl)(3,4-dimethyl-cyclopentadienyl)zirconium dichloride, di-o-tolylmethylene(cyclopentadienyl)(3,4-dimethyl-cyclopentadienyl) zirconium dichloride, di-o-tolylmethylene (cyclopentadienyl)(3,4-dimethylcyclopentadienyl) zirconium dichloride, di-o-tolylmethylene (cyclopentadienyl)(indenyl)zirconium dichloride, dibenzylmethylene(cyclopentadienyl)(tetramethylcyclopentadienyl)zirconium dichloride, dibenzylmethylene(cyclopentadienyl)(indenyl)zirconium dichloride, dibenzylmethylene(cyclopentadienyl)(fluorenyl)zirconium dichloride, dicyclohexylmethylene(cyclopentadienyl)(indenyl)zirconium dichloride, dicyclohexyl(cyclopentadienyl)(fluorenyl) zirconium dichloride, dicyclohexylmethylene(2-methylcyclopentadienyl)(fluorenyl)zirconium dichloride, diphenylsilyl(2,4-dimethylcyclopentadienyl)(3',5-dimethyl-cyclopentadienyl)zirconium dichloride, diphenylsilyl(2,4-dimethylcyclopentadienyl)(3',5'-dimethylcyclopentadienyl) zirconium dichloride, diphenylsilyl (2,3,5-trimethylcyclopentadienyl)(2,4,trimethylcyclopentadienyl) zirconium dichloride, tetraphenyldisilyl(cyclopentadienyl) (indenyl)zirconium dichloride, tetraphenyldisilyl(3-methylcyclopentadienyl)(indenyl)zirconium dichloride, tetraphenyldisilyl(cyclopentadienyl)(fluorenyl)zirconium dichloride, di-o-tolylsilyl(cyclopentadienyl)(trimethylcyclopentadienyl)zirconium dichloride, di-o-tolylsilyl(cyclopentadienyl)(tetramethylcyclopentadienyl)zirconium dichloride, di-o-tolylsilyl(cyclopentadienyl)(3,4-diethylcyclopentadienyl)zirconium dichloride, di-o-tolylsilyl(cyclopentadienyl)(triethylcyclopentadienyl) zirconium dichloride, dibenzylsilyl(cyclopentadienyl) (fluorenyl)zirconium dichloride, dibenzylsilyl (cyclopentadienyl)(2,7-di-t-butyl-fluorenyl)zirconium dichloride, dicyclohexylsilyl(cyclopentadienyl)(fluorenyl) zirconium dichloride, and diphenylmethylene(cyclopentadienyl-9-fluorenyl)zirconium dichloride.

The cocatalyst, or activator, employed with the metallocene procatalysts of formula (I) can be any of the aluminoxanes known to activate metallocene procatalysts. Exemplary aluminoxane cocatalysts include alkylaluminoxanes such as methylaluminoxane (MAO). See, e.g., U.S. Pat. No. 5,229,478, the entirety of which is incorporated by reference as if fully set forth herein.

In general, the bridged metallocene procatalyst can be present in the reactor in an amount, expressed in terms of its transition metal content, of from about 0.0001 mmol/L to about 0.05 mmol/L, preferably from about 0.0002 mmol/L to about 0.025 mmol/L and more preferably from about 0.00025 mmol/L to about 0.02 mmol/L.

Corresponding to these amounts of transition metal, the aluminoxane cocatalyst can be utilized in an amount of from about 0.002 mmol/L to about 50 mmol/L, preferably from about 0.002 mmol/L to about 25 mmol/L and more preferably from about 0.02 mmol/L to about 10 mmol/L. The optimum levels of bridged metallocene procatalyst and aluminoxane cocatalyst will, to some extent, depend upon the specific procatalyst and cocatalyst selected as well as other polymerization process variables.

In terms of levels of aluminoxane cocatalyst to metallocene procatalyst, the levels can be about 1000:1, about 750:1, about 500:1, about 250:1, about 100:1, about 50:1, or about 25:1. In some embodiments, the level of metallocene procatalyst to aluminoxane cocatalyst is preferably 500:1. In other embodiments, the level of metallocene procatalyst to aluminoxane cocatalyst is preferably 100:1. In still other embodiments, the level of metallocene procatalyst to aluminoxane cocatalyst is preferably 25:1.

When employing an aluminoxane cocatalyst, it can be advantageous to include a trialkylaluminum compound such as trimethylaluminum, triethylaluminum, tri(n-propyl)aluminum, triisopropylaluminum, tri(n-butyl)aluminum, triisobutylaluminum, and the like, to reduce the amount of aluminoxane required for suitable activation of the metallocene procatalyst. In general, the optional trialkylaluminum can be utilized in a molar level to metallocene procatalyst of from about 1 to about 1000 and preferably from about 2 to about 500.

It is also contemplated that a neutral or anionic metalloid-containing component can optionally be employed with the aluminoxane cocatalyst in activating the metallocene procatalyst. Exemplary neutral metalloid-containing components include boranes such as perfluoroarylborane compounds, e.g., tris(pentafluorophenyl)borane, tris(methoxyphenyl)borane, tris(trifluoromethylphenyl)borane, tris(3,5-di[trifluoro-methyl]phenyl)borane, tris(tetrafluoroxylyl)borane, tris(tetrafluoro-o-tolyl)borane, and the like. Of the foregoing boranes, tris(pentafluorophenyl)borane and tris(3,5-di[trifluoromethyl]phenyl)borane are preferred. Other useful second components include aluminum homologues of the foregoing compounds.

Exemplary anionic metalloid-containing components include borates such as perfluoroaryl borates, e.g., lithium tetrakis(pentafluorophenyl)borate, lithium tetrakis(trifluoromethylphenyl)borate, lithium tetrakis(3,5-di[tri-fluoromethyl]phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl)borate, tin tetrakis(pentafluorophenyl)borate, dimethylanilinium tetrakis(pentafluorophenyl)borate and the like. Of the foregoing borates, dimethylaniliniumtetrakis(pentafluorophenyl)borate and alkali metal borates such as lithium tetrakis(pentafluorophenyl)borate and lithium tetrakis(3,5-di[trifluoro-methyl]phenyl)borate are preferred. In some embodiments, aluminate homologues of the foregoing compounds may be used.

In general, neutral or anionic metalloid-containing components can be utilized in a molar level to metallocene procatalyst of about 1:2, about 1:1.5, about 1:1, or about 1:0.5. When the anionic metalloid-containing component is dimethylaniliniumtetrakis(pentafluorophenyl)borate, the level of the borate to the metallocene procatalyst is 1:1.

Activation of the metallocene to yield an activated metallocene catalyst composition can be achieved by combining the aforementioned metallocene procatalysts with the aluminoxane cocatalyst, optionally in the presence of a neutral or anionic metalloid-containing component, either simultaneously or in any sequence and with any interval of time therebetween and either in the presence of, or in the absence of, the olefin monomer(s) and hydrogen. The activation optionally occurs at a temperature ranging from 0 to 100° C., and optionally for a time period ranging from 1 minute to 72 hrs. Optionally, activation occurs in from 0 to 99% of an inert hydrocarbon solvent, either aliphatic or aromatic. In a preferred embodiment, the metallocene catalyst is activated for 10 minutes at room temperature and with toluene as solvent.

In some embodiments, the activated metallocene catalyst compositions is prepared in advance and thereafter the composition is introduced into the polymerization reactor with the olefin monomer (s), optionally in the presence of hydrogen.

The reaction of the metallocene procatalyst with the aluminoxane cocatalyst to generate an activated metallocene catalyst is conducted at a temperature ranging from about 0 to about 100° C., e.g., from about 0 to about 80° C., from about 10 to about 50° C., or from about 25 to about 50° C.; for a time period of from about 1 minute to about 72 hours, e.g. from about 1 minute to about 50 hours, from about 1 minute to about 30 hours, or from about 1 minute to about 24 hours.

Polymerization or copolymerization of the aforementioned monomers, optionally using hydrogen, and the activated metallocene catalyst can be carried out in any known manner, e.g., in the liquid phase (i.e., in a solution or slurry process) or in a suspension process, either continuously or in batch. These processes are generally carried out at temperatures in the range of from about 0° C. to about 200° C., e.g., from about 0° C. to about 150° C., from about 10° C. to about 100° C., or from about 50° C. to about 150° C. When the polymerization or copolymerization is carried out in the presence of hydrogen, exemplary pressures of hydrogen used include from about 10 to about 3000 psig, e.g., from about 10 to about 500 psig, from about 10 to about 200 psig, from about 50 to about 150 psig, or from about 10 to about 60 psig.

It should be recognized that control of the polymerization temperature has a direct bearing on the quality of the polymerization, e.g., activity, as well as the final product properties, e.g., the level of unsaturation in the polymer as evidenced by the iodine number. Generally, as the polymerization temperature approach 150° C. or greater, the maximum temperature reached during the polymerization, even in situations where there is an exotherm, should be substantially close to the initial polymerization temperature. In some instances, however, care should be taken at polymerization temperatures exceeding 150° C. such that the polymerization temperature, even in situations where there is an exotherm, is not more than about 20° C. greater than the initial polymerization temperature.

Due to the nature of the final liquid polyolefin, the polymerization can be carried out in neat liquid monomer (i.e., in the absence of solvent) or, if desired, in the presence of solvent. Dilution solvents that can be employed include straight and branched chain hydrocarbons such as the butanes, the pentanes, the hexanes, the heptanes, the octanes, the decanes, and the like, cyclic and alicyclic hydrocarbons such as cyclopentane, cyclohexane, cycloheptane, methylcyclopentane, methylcyclohexane, methylcycloheptane and the like, and alkyl-substituted aromatic compounds such as toluene, xylene, and the like and mixtures thereof.

A typical batch solution polymerization process can be carried out by first introducing the liquid monomer, e.g., 1-decene, either alone or in combination with an optional hydrocarbon solvent, e.g., hexane, xylenes, etc., into a stirred tank reactor. If copolymerization is carried out in the presence of an additional liquid monomer, e.g., 1-octene, it can be added either sequentially or simultaneously with the other monomer. If copolymerization is carried in the presence of a gaseous monomer, e.g., propene, the gaseous monomer is sparged either into a solution of the other monomer (gaseous or liquid) or into a neat liquid monomer. Typical pressures of gaseous monomer are from about 10 to about 100 psig, e.g., from about 10 to about 80 psig, from about 10 to about 60 psig, or from about 10 to about 50 psig. In a preferred embodiment, a polyalphaolefin is formed from the copolymerization of a decene and propene. In a particularly preferred embodiment, the decene is 1-decene. When 1-decene is copolymerized with propene, the feed level of 1-decene to propene is from about 100:1, from about 100:2, from about 100:5 or from about 100:10.

A minor amount of an inert impurity scavenger, e.g., the aforementioned trialkylaluminum compounds, can optionally be added. The reactor is then heated or cooled to the desired temperature and a measured amount of hydrogen can optionally and separately be introduced into the stirred tank reactor. By carrying out the polymerization reaction in the presence of hydrogen, a hydrogenation step is eliminated and the liquid polyalphaolefins of some embodiments of the present invention are substantially saturated and, therefore, will possess a low iodine value, e.g., an iodine number of from about 0.0 to about 10, preferably from about 0.1 to about 5, and most preferably from about 0.2 to about 3.

Once the desired conditions are established, a hydrocarbon solution of the catalyst in the required amounts are then added to the liquid phase in the reactor. The rate of polymerization is controlled by the concentration of the catalyst and monomer(s) present or added during polymerization. The reactor temperature is controlled by means of cooling coils, etc., and the initial total pressure in the reactor is maintained by a constant flow of hydrogen, inert gas, gaseous monomer(s) or a combination thereof. After polymerization is complete, the reactor is depressurized and the catalyst is deactivated by conventional means. Spent catalyst components can be isolated from the reaction product via mixing with, e.g., alcohol, water, or a mixture of both, then by phase separation of the hydrocarbyl component from the aqueous component. Alternatively, a basic solid such as calcium oxide may be mixed with the reaction product and filtered. The liquid polyolefin can then be recovered from the hydrocarbyl component by conventional methods, e.g., evaporation, distillation, etc., and then further processed as desired.

Depending on the amount of monomer conversion and viscosity of the reactor contents, a hydrocarbon solvent can be added to aid in removal of the product liquid polyolefin. Spent catalyst components can be isolated from the reaction product via mixing with, e.g., alcohol, water or a mixture of both, then by phase separation of the hydrocarbyl component from the aqueous component. The liquid polyolefin can then be recovered from the hydrocarbyl component by conventional methods, e.g., evaporation, distillation, etc., and then further processed as desired.

EXAMPLES

The present invention will now be further described with reference to the following non-limiting Examples.

Example 1

In a glove box, 0.02 grams of $Ph_2C(Cp-9-Flu)ZrCl_2$ was weighed into a 25 ml vial. 12 ml of 1.5M MAO was added to the vial and the resulting mixture was dissolved in a shaker for 10 minutes at room temperature.

A moisture and air free 3 liter Buchi reactor was charged with 670 grams of dry 1-decene monomer. The reactor was then purged with nitrogen. The reactor was brought to a temperature of 90° C. 33 grams of propene was then added to the reactor, which resulted in raising the reactor pressure to 38 psig. Hydrogen was added to the reactor to bring the reactor pressure to 50 psig. Using a dry 5 ml syringe and needle, 5 ml of catalyst solution was added to the reactor. With 550 rpm of agitation, the reaction was allowed to proceed for 30 minutes. The reactor was then vented and purged with nitrogen and the product was allowed to cool to a safe temperature for removal.

A portion of the reactor contents, 100 grams, was transferred to a vessel equipped with an agitator, and 2.0 grams of powdered calcium oxide was added, heated to 60° C. and the solution was mixed for 30 minutes. The solution was then filtered using a pressure filter with 40 psi nitrogen pressure and a 10 micron filter disk.

The polymer was then obtained from the remaining organic solution by evaporation under reduced pressure in a rotary evaporator. The polyolefin material obtained had a kinematic viscosity at 100° C. of 964 cSt and a branch level of 22% measured as % $C_3$.

Example 2

Example 2 was prepared in the same manner as Example 1, but nitrogen was used in place of the propene being add to the same pressure level increase as found in Example 1. The polymer was determined to have a kinematic viscosity of 760 cSt at 100° C. and a branching level of 19%.

Example 3

A lower level of CoCatalyst:Catalyst and the addition of activator was used. In a glove box, 0.02 grams of $Ph_2C(Cp-9-Flu)ZrCl_2$ and 0.0288 grams of dimethylaniliniumtetrakis (pentafluorophenyl)borate were weighed out into a 25 ml vial. 2.4 ml of 1.5M MAO solution and 9.6 grams of toluene were added to the vial and the mixture was allowed to dissolve using a shaker for 10 minutes at room temperature. The remainder of the procedure was the same as Example 1. The polymer in this example was found to have a kinematic viscosity of 967 cSt at 100° C. and a branching level of 22%.

Example 4

Example 4 was prepared in the same manner as Example 3, except nitrogen was used in place of the propene and to a similar pressure level increase as found in Example 3. The polymer was determined to have a kinematic viscosity of 875 cSt at 100° C. and a branching level of 19%.

Example 5

A further reduction in the level of CoCatalyst:Catalyst and the addition of activator was used with a lower level of propene. In a glove box, 0.02 grams of $Ph_2C(Cp-9-Flu)ZrCl_2$ and 0.0288 grams of dimethylaniliniumtetrakis(pentafluorophenyl)borate were weighed out into a 25 ml vial. 0.6 ml of 1.5M MAO solution and 11.4 grams of toluene were added to the vial and the mixture was allowed to dissolve using a shaker for 10 minutes at room temperature. The remainder of the procedure was the same as Example 1, except only 15 grams of propene was added to a pressure increase of 23 psig. The polymer in this example was found to have a kinematic viscosity of 754 cSt at 100 C and a branching level of 20%.

The process parameters and results of Examples 1-5 are summarized below in Table 1.

TABLE 1

EXAMPLES 1-5

| | EXAMPLE # | | | | |
|---|---|---|---|---|---|
| | 1 | 2 | 3 | 4 | 5 |
| Polymerization Temperature: (° C.) | 90 | 90 | 90 | 90 | 90 |
| Polymerization Time: (Minutes) | 30 | 30 | 30 | 30 | 30 |
| Propene, g (psig) | 33 (38) | 0 ($N_2$ 38) | 33 (40) | 0 ($N_2$ 38) | 15 (23) |
| Co-Catalyst Type | MAO[1] | MAO | MAO | MAO | MAO |
| mL of 10% (1.5M) MAO solution | 12 | 12 | 2.4 | 2.4 | 0.6 |
| [cocatalyst amount] | [1.05 gr] | [1.05 gr] | [0.21 gr] | [0.21 gr] | [0.053 gr] |
| $H_2$ 100% psig | 50 | 50 | 50 | 50 | 50 |
| Catalyst Activator Type: | None | None | Borate[2] | Borate | Borate |
| Activator: (grams) | 0 | 0 | 0.0288 | 0.0288 | 0.0288 |
| Agitator Speed, rpm | 550 | 550 | 550 | 550 | 550 |
| Decene, grams | 670 | 670 | 670 | 670 | 670 |
| Co-Catalyst:Catalyst Molar Level, MAO:Zr | 500:1 | 500:1 | 100:1 | 100:1 | 25:1 |
| Activator:Catalyst Molar Level, Borate:Zr | 0:1 | 0:1 | 1:1 | 1:1 | 1:1 |
| Pro-catalyst Type: | PCF[3] | PCF | PCF | PCF | PCF |
| Catalyst Concentration (M) | 0.0030 | 0.0030 | 0.0030 | 0.0030 | 0.0030 |
| Catalyst Added, grams | 0.0083 | 0.0083 | 0.0083 | 0.0083 | 0.0083 |
| Cocatalyst Added, grams | 0.4375 | 0.4375 | 0.0875 | 0.0875 | 0.0219 |
| Activator Added, grams | 0 | 0 | 0.01195 | 0.01195 | 0.01195 |
| Kinematic Viscosity, cSt | 964 | 760 | 967 | 875 | 754 |
| Branch Level (% $C_3$)[4] | 22 | 19 | 22 | 19 | 20 |

[1]MAO = methylaluminoxane
[2]Borate = dimethylaniliniumtetrakis (pentafluorophenyl) borate
[3]PCF = diphenylmethylene(cyclopentadienyl-9-fluorenyl)zirconium dichloride
[4]% C3 = Determined by infrared spectroscopy of thin polymer films on a Perkin-Elmer infrared spectrophotometer model Spectrum 1000, by comparison of the relative intensities of methyl to methylene groups in the polymer. This method closely parallels measurements from ASTM standard D3900, which determines the relative ethylene to propene level in EP 9 copolymers.

Examples 6-9

Examples 6-9 utilized a 1250 ml continuous reactor setup where two monomers, catalyst and hydrogen were independently fed with stirring.

In a glove box two catalyst preparations were made. The initial catalyst preparation, for initiating the reaction, was prepared by weighing out 0.01 grams of $Ph_2$ (Cp-9-Flu)$ZrCl_2$ and 0.0144 grams of dimethylaniliniumtetrakis(pentafluorophenyl)borate into a 25 ml vial, adding 2.4 ml of 1.5M MAO solution and 2.6 grams of toluene and dissolving the mixture using a shaker for 10 minutes at room temperature. The second catalyst preparation, for use in the continuous reaction, was prepared by adding 0.07 grams of $Ph_2C$(Cp-9-Flu)$ZrCl_2$, 0.101 grams of dimethylaniliniumtetrakis(pentafluorophenyl)borate, 21 ml of 1.5M MAO solution and 40 ml of toluene to a 100 ml bottle and dissolving the mixture using a shaker for 10 minutes at room temperature.

The moisture and air free reactor was initially charged to about ¾ full with 940 ml (695 grams) of dry decene and heated to 100° C. Hydrogen was added to bring the reactor to 30 psig. The initial catalyst preparation was injected into the reactor with 550 rpm agitation. The reactor was pressurized with hydrogen to 100 psig and the reaction was allowed to run for 72 minutes.

Example 6

Continuous polymerization was commenced with the addition of decene at a rate of 25 gr/min, a hydrogen flow of 100 SLPH and 0.4 gr/min catalyst solution. An exotherm confirmed reaction and temperature was held at 125 C. One hour after the continuous polymerization was started the polymer solution was sampled.

A portion of the sample, 100 grams, was transferred to a vessel equipped with an agitator and 2.0 grams of powdered calcium oxide was added, heated to 60 C and the solution mixed for 30 minutes. The solution was filtered using a pressure filter with 40 psi nitrogen pressure and a 10 micron filter disk.

The polymer was obtained from the remaining organic solution by evaporation under reduced pressure in a rotary evaporator. The polyolefin material obtained had a kinematic viscosity at 100° C. of 138.7 cSt and a branching level of 19% measured as % $C_3$.

Example 7

Continuous polymerization continued with the addition of propene at 2.5 gr/min. Four minutes after the propene feed was started, the polymer solution was sampled.

A portion of the sample, 100 grams, was transferred to a vessel equipped with an agitator and 2.0 grams of powdered calcium oxide was added, heated to 60° C. and the solution mixed for 30 minutes. The solution was filtered using a pressure filter with 40 psi nitrogen pressure and a 10 micron filter disk.

The polymer was obtained from the remaining organic solution by evaporation under reduced pressure in a rotary evaporator. The polyolefin material obtained had a kinematic viscosity at 100° C. of 140.4 cSt and a branching level of 21% measured as % $C_3$.

Example 8

Continuous polymerization continued with the propene addition. Thirty minutes after the propene feed was started the polymer solution was sampled.

A portion of the sample, 100 grams, was transferred to a vessel equipped with an agitator and 2.0 grams of powdered calcium oxide was added, heated to 60° C. and the solution mixed for 30 minutes. The solution was filtered using a pressure filter with 40 psi nitrogen pressure and a 10 micron filter disk.

The polymer was obtained from the remaining organic solution by evaporation under reduced pressure in a rotary evaporator. The polyolefin material obtained had a kinematic viscosity at 100° C. of 160.2 cSt and a branching level of 21% measured as % $C_3$.

Example 9

Continuous polymerization was stopped and the reaction allowed to proceed. Thirty minutes after the feeds were stopped the polymer solution was sampled.

A portion of the sample, 100 grams, was transferred to a vessel equipped with an agitator and 2.0 grams of powdered calcium oxide was added, heated to 60° C. and the solution mixed for 30 minutes. The solution was filtered using a pressure filter with 40 psi nitrogen pressure and a 10 micron filter disk.

The polymer was obtained from the remaining organic solution by evaporation under reduced pressure in a rotary evaporator. The polyolefin material obtained had a kinematic viscosity at 100° C. of 133.0 cSt and a branching level of 22% measured as % $C_3$.

The process parameters and results of Examples 6-9 are summarized in Table 2, below.

TABLE 2

EXAMPLES 6-9

| | EXAMPLE # | | | |
|---|---|---|---|---|
| | 6 | 7 | 8 | 9 |
| Propene | No | Yes | Yes | Yes |
| Solids Wt. %[1] | 72.0 | 76.5 | 71.3 | 84.4 |
| Efficiency, g/g cat | n/a | 44538 | 57707 | n/a |
| Kinematic Viscosity, cSt @ 100 C. | 133.0 | 140.4 | 160.2 | 134.6 |
| Kinematic Viscosity, cSt @ 40 C. | 1195.9 | — | — | 1394.6 |
| VI | 220 | — | — | 204 |
| Branch Level (% $C_3$)[2] | 19.05 | 21.45 | 21.63 | 22.54 |
| Iodine #[3] | 2.8 | — | — | 2.3 |
| Molecular Weight, Mw[4] | 8065 | — | — | 7768 |
| Molecular Number, Mn[4] | 3792 | — | — | 3784 |
| Polydispersity, Mw/Mn[4] | 2.1 | — | — | 2.1 |
| Pour Point, ° C. | −36 | — | — | −36 |

[1]Solids test = 2 g crude PAO was placed in an aluminum dish and placed on a preheated hot plate. The surface temperature of plate was between 200-210° C., was held for 20 min., removed, cooled and reweighed. The solids was the final weight divided by the initial weight times 100 - in %.
[2]% C3 = Determined by infrared spectroscopy of thin polymer films on a Perkin-Elmer infrared spectrophotometer model Spectrum 1000, by comparison of the relative intensities of methyl to methylene groups in the polymer. This method closely parallels measurements from ASTM standard D3900, which determines the relative ethylene to propene level in EP copolymers.
[3]Iodine # = method ASTM D5768
[4]Mw, Mn and Polydispersity = Gel Permeation Chromatography using polystyrene standards.
5 Pour Point = ASTM D97

High viscosity PAO products are typically used to thicken lower viscosity PAO products to make lubricants with an acceptable viscosity for their intended applications. Viscosity is a key property of a lubricant and several professional organizations have created systems to classify viscosity ranges that can be applied to the desired application. One such organization is the Society of Automotive Engineers (SAE). In their publication SAE J-306, the entirety of which is incorporated herein by reference, one such viscosity grade defined for use in gear lubricants is an SAE 90 grade. Lubricants meeting this viscosity grade have a kinematic viscosity of 13.5 to <18.5 cSt at 100° C. A typical viscosity target for such products is 14.5 cSt. A blend using a PAO of the current invention with decene and propene as the monomers and having >19% branching level have demonstrated improved thickening efficiency while maintaining the important low temperature characteristics of the non-propene containing polymer. Improved thickening efficiency is defined as requiring less of the high viscosity PAO to meet the targeted kinematic viscosity at 100° C.

Table 3, below, shows the kinematic and Brookfield viscosities of SAE 90 blends of PAO from Example 4 and the PAO's of Examples 6 and 9.

TABLE 3

VISCOSITIES OF BLENDS FROM EXAMPLES 6 AND 9

| | SAE 90 Blends Using Example | |
|---|---|---|
| | 6 | 9 |
| PAO 4 (vol %) | 59.7 | 61.7 |
| Example 6 (vol %) | 40.3 | — |
| Example 9 (vol %) | — | 38.3 |
| Kinematic Viscosity, cSt @ 100° C. | 14.6 | 14.4 |
| Brookfield Viscosity, cP @ −40° C.[1] | 21,250 | 23,250 |

[1]Using method ASTM D-2983

Any feature described or claimed with respect to any disclosed implementation may be combined in any combination with any one or more other feature(s) described or claimed with respect to any other disclosed implementation or implementations, to the extent that the features are not necessarily technically incompatible, and all such combinations are within the scope of the present invention. Furthermore, the claims appended below set forth some non-limiting combinations of features within the scope of the invention, but also contemplated as being within the scope of the invention are all possible combinations of the subject matter of any two or more of the claims, in any possible combination, provided that the combination is not necessarily technically incompatible. All patents, patent applications and publications cited herein are incorporated by reference in their entirety.

What is claimed is:

1. A polyalphaolefin comprising 75 wt % to 99 wt % 1-decene monomers and 1 wt % to 25 wt % propene monomers said polyalphaolefin having a branch level greater than 20%, a kinematic viscosity of between 20 and 1000 cSt at 100° C. and a pour point that is less than −15° C.,
wherein said polyalphaolefin is formed by polymerizing a mixture of decene and propene monomers in the presence of a catalyst system comprising a metallocene catalyst and an aluminoxane co-catalyst, said metallocene catalyst having the formula

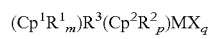

$(Cp^1R^1{}_m)R^3(Cp^2R^2{}_p)MX_q$ wherein M is zirconium,
q is 2, X is halogen,
$(Cp^1R^1{}_m)$ is substituted or unsubstituted cyclopentadienyl,
$(Cp^2R^2{}_p)$ is indenyl or flourenyl and $R^3$ is a group bridging $(Cp^1R^1{}_m)$ and $(Cp^2R^2{}_p)$ and having a formula

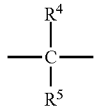

wherein $R^4$ and $R^5$ are selected from cycloalkyl, aryl or alkaryl.

2. The polyalphaolefin of claim 1, wherein the polyalphaolefin has a Brookfield viscosity at −40° C. when formulated in a SAE 90 blend of less than 45,000 cPs.

3. The polyalphaolefin of claim 1, wherein said metallocene catalyst comprises $Ph_2C(Cp\text{-}9\text{-}Flu)ZrCl_3$.

4. The polyalphaolefin of claim 1, wherein the branch level is greater than 21%.

5. The polyalphaolefin of claim 1, wherein the branch level is greater than 22%.

6. A process for forming a polyalphaolefin, the process comprising the step of polymerizing mixture of decene and propene monomers in the presence of a catalyst system comprising a metallocene catalyst and an aluminoxane co-catalyst, said metallocene catalyst having the formula

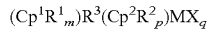

wherein M is zirconium,
q is 2, X is halogen,
$(Cp^1R^1{}_m)$ is substituted or unsubstituted cyclopentadienyl,
$(Cp^2R^2{}_p)$ is indenyl or flourenyl and
$R^3$ is a group bridging $(Cp^1R^1{}_m)$ and $(Cp^2R^2{}_p)$ and having a formula

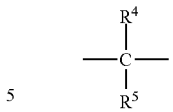

wherein $R^4$ and $R^5$ are selected from cycloalkyl, aryl or alkaryl, wherein the polyalphaolefin comprises 75 wt % to 99 wt % 1-decene monomers and 1 wt % to 25 wt % propene monomers and has a branch level greater than 20% a kinematic viscosity of between 20 and 1000 cSt at 100° C. and a pour point that is less than −15'C.

7. The process of claim 6, wherein the branch level is greater than 21%.

8. The process of claim 6, wherein the branch level is greater than 22%.

9. The process of claim 6, wherein the metallocene catalyst comprises $Ph_2C(Cp\text{-}9\text{-}Flu)ZrCl_2$.

10. The process of claim 6, wherein the aluminoxane co-catalyst is an alkylaluminoxane.

11. The process of claim 10, wherein the aluminoxane co-catalyst is methylaluminoxane.

12. The process of claim 6, wherein the catalyst system further comprises a borate.

13. The process of claim 12, wherein the borate is selected from the group consisting of lithium tetrakis(pentafluorophenyl)borate, lithium tetrakis(trifluoromethylphenyl)borate, lithium tetrakis(3,5-di{tri-fluoromethyl}phenyl)borate, sodium tetrakis(pentafluoro-phenyl)borate, potassium tetrakis(pentafluorophenyl)borate, magnesium tetrakis(pentafluorophenyl)borate, titanium tetrakis(pentafluorophenyl) borate, tin tetrakis(pentafluorophenyl)borate, and dimethylanilinium tetrakis(pentafluorophenyl)borate.

* * * * *